UNITED STATES PATENT OFFICE.

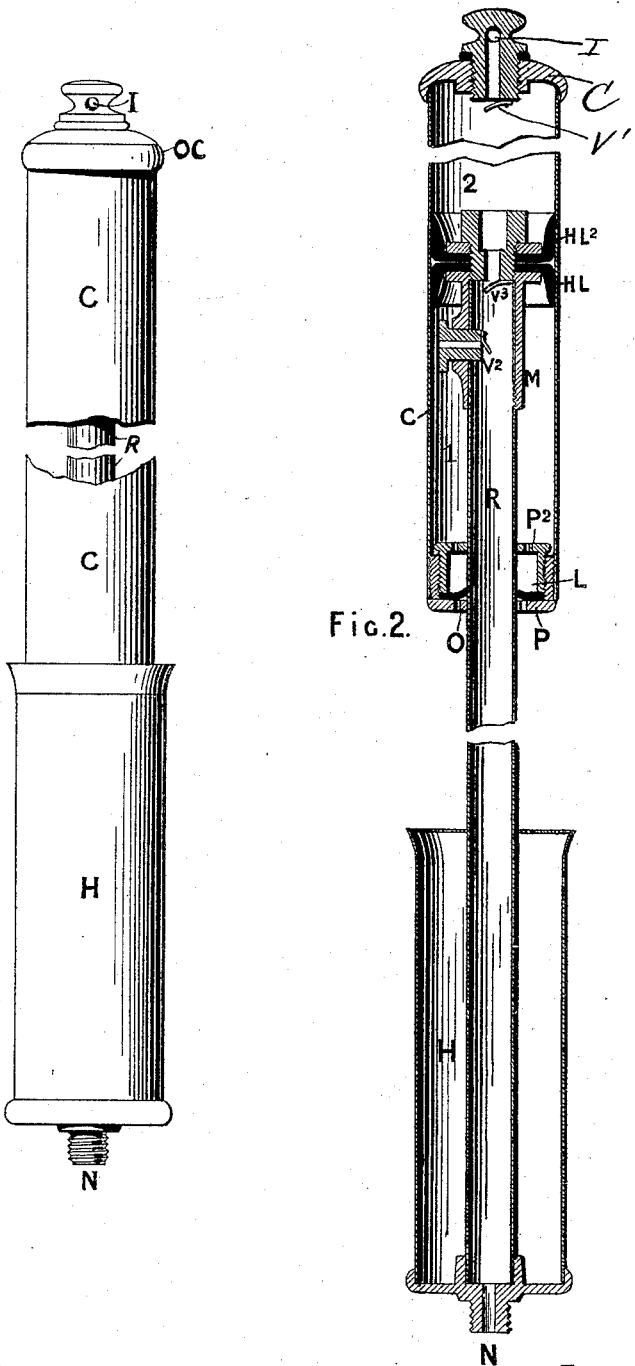

HERBERT GUEST, OF SHEFFIELD, ENGLAND.

POCKET AIR-PUMP.

SPECIFICATION forming part of Letters Patent No. 497,050, dated May 9, 1893.

Application filed December 8, 1892. Serial No. 454,548. (No model.) Patented in England September 7, 1892, No. 16,025.

*To all whom it may concern:*

Be it known that I, HERBERT GUEST, a subject of the Queen of Great Britain, and a resident of Sheffield, in the county of York, England, have invented certain new and useful Improvements in Pocket Air-Pumps for Inflating Pneumatic Tires and other Articles; and I do hereby declare that the following is a full, clear, and exact description thereof, reference being had to the accompanying drawings, which form a part of this specification.

This invention has been patented in Great Britain September 7, 1892, No. 16,025.

This invention relates to improvements in the construction of a class of pocket or hand air pumps, termed inflators, used for the inflation of pneumatic tires of bicycles, footballs, and other articles requiring inflation.

The object of my invention is to construct an inflator that will give a supply of air at each inward and outward stroke of the piston or pistons employed, and thereby expel a constant stream of compressed air from the cylinder (or cylinders) instead of intermittent jets.

The accompanying drawings illustrate a single cylinder inflator, made in the manner I prefer, and according to my invention.

Figure 1, is a view of the inflator closed, and with the cylinder broken to show the rod. Fig. 2, is a sectional view of the inflator partly drawn out.

Similar letters of reference indicate similar parts in both of the figures.

In carrying out my invention in constructing a single cylinder inflator, such as that shown in the drawings for example, I make a cylinder C, of metallic tubing, of suitable length and diameter, having a piston of a peculiar construction, and a tubular piston rod R, provided with a conveniently formed handle H, preferably made tubular and so as to pass over the cylinder C. The front end of the piston rod (or of the handle to which the rod is connected) is provided with a nozzle N, to which a length of rubber tube may be readily attached to connect the inflator with the article to be inflated.

Both ends of the cylinder C are closed, the front end by the plug P, (or by other means) and the back end by the outside cap C'; this cap is provided with an air inlet I, to admit, and a valve V' to prevent the escape of, air from the inside. The front plug P, is provided with a packing leather L, held in position by the hollow screwed plug $P^2$ and fitting closely round the piston rod; it permits the passage of air through the openings O, into the cylinder, but prevents its return and escape therefrom. The cylinder is divided into two compartments by the piston, which is attached to the end of the piston rod, and is composed of two "hat" leathers HL and $HL^2$ which resist the pressure, and prevent the passage, of the imprisoned air in either direction.

Connected with the piston end of the rod R, (and preferably to an attached piece of metal M, specially constructed) are two valves $V^2$, and $V^3$. The valve $V^3$ permits the passage of air from the compartment 2 through the piston into the tubular piston rod R, and out through the nozzle N, when compressed by the piston, at the same time closing the valve $V^2$. When the action is reversed, the air which has entered the compartment 1, through the openings O, and passed the leather L, is compressed and passes through the valve $V^2$, into the rod R, closing the valve $V^3$, and passing out through the nozzle N, the same action draws air through the inlet I, and valve V' into the compartment 2, to be again expelled by the next stroke of the piston.

Although I have described the arrangement of the apparatus that I prefer, I do not wish to limit myself strictly to the form shown nor to the precise arrangement of the valves.

My improved construction may be applied equally well to inflators having more than one cylinder.

Where compactness is not absolutely necessary, other forms of handles than that shown may be used, and I wish it to be understood that I do not claim the handle shown as part of my said invention, but:

Having now particularly described and ascertained the nature of my said invention and in what manner the same is to be carried into practice, I declare that what I claim is—

In combination, the cylinder, the valves at the ends thereof, the piston dividing the cylinder into two chambers, the hollow piston rod, the valve $V^3$ at the end thereof controlling a port through the piston into the chamber 2 and the valve $V^2$ controlling a laterally extending port from the hollow piston rod to the chamber 1, substantially as described.

In testimony that I claim the foregoing as my own I have affixed hereto my signature, in presence of two witnesses, this 18th day of November, 1892.

HERBERT GUEST.

Witnesses:
ROBT. F. DRURY,
ENSOR D. DRURY.